Nov. 30, 1954

L. E. GARTNER 2,695,986

VOLTAGE REGULATING MEANS FOR PERMANENT
MAGNET DYNAMOELECTRIC MACHINES

Filed April 22, 1952

INVENTOR.
LAWRENCE E. GARTNER
BY
*James M. Nickels*
ATTORNEY

United States Patent Office 2,695,986
Patented Nov. 30, 1954

2,695,986

VOLTAGE REGULATING MEANS FOR PERMANENT MAGNET DYNAMOELECTRIC MACHINES

Lawrence E. Gartner, Lodi, N. J., assignor to Bendix Aviation Corporation, Teterboro, N. J., a corporation of Delaware Application April 22, 1952, Serial No. 283,703

5 Claims. (Cl. 322—28)

The present invention relates to fixed excitation alternators such as a permanent magnet field alternator, and more particularly to the regulation of the output voltage of such an alternator.

Fixed excitation alternators, such as, for example, a permanent magnet field alternator, are usually designed for supplying the correct voltage to a fixed load at a given speed and frequency, or to a fixed load that is capable of accepting an increased voltage with increasing speed and frequency.

For some applications, it may be desirable to use such an alternator yet maintain some control of voltage under varying load and frequency. It is known that within limits the internal operating power factor angle of an alternator is instrumental in determining the magnitude of the output voltage. For example, a leading power factor or leading current tends to strengthen the magnetic field and hence increase the generated or internal voltage; whereas, a lagging power factor tends to decrease the generated or internal voltage. In the present invention the power factor is controlled by a carbon pile resistance element so connected that output voltage is sensed, and the carbon pile element varies the current in a compensating capacitor, thus varying the power factor to maintain the output voltage within a predetermined range.

It is an object of the invention to provide novel regulating means for a fixed excitation alternator.

Another object of the invention is to provide novel means for controlling the power factor in a permanent magnet field alternator as a function of output voltage.

Another object of the invention is to provide novel voltage control means for a permanent magnet field alternator.

The above and other objects and features of the invention will appear more fully hereinafter from a consideration of the following description taken in connection with the accompanying drawing wherein three embodiments of the invention are illustrated by way of example.

In the drawing.

In the drawing similar parts have been assigned the same reference numerals in the various figures.

Figure 1:
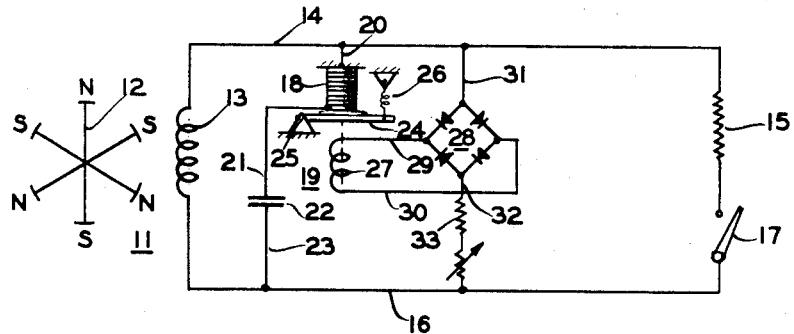
Figure 1 is a schematic diagram of a generator system embodying the invention.

Referring now to Figure 1, a permanent magnet field alternator is indicated generally by the numeral 11 and has a permanent magnet rotor 12 and output winding 13. The rotor 12 is adapted to be driven from a suitable power source (not shown) and while a six pole rotor has been illustrated, it is understood that it is not necessarily limited to that number but may have any number of pairs of poles.

One end of the winding 13 is connected by conductor 14 to one side of a suitable load 15. The other end of the winding 13 is connected by a conductor 16 to the other side of the load 15. A switch member 17 may be inserted in the conductor 16 to control the connection to the load 15.

One end of a variable resistance or carbon pile element 18, of a regulator indicated generally by the numeral 19, is connected by conductor 20 to the conductor 14. The opposite end of the carbon pile element 18 is connected by conductor 21 to one side of a capacitor 22. The other side of the capacitor is connected by a conductor 23 to the conductor 16.

The regulator 19 is illustrated diagrammatically as including an armature 24 pivoted at 25 and biased under tension of a spring 26 in a direction tending to decrease the resistance of the pile 18 and thereby increasing the current in the capacitor 22.

An electromagnetic winding 27 biases the armature 24 in a direction opposing the spring 26 and tending to increase the resistance of the carbon pile 18 so as to decrease the current in the capacitor 22. The winding 27 is connected across the output of a rectifier 28 by conductors 29 and 30. One input terminal of the rectifier 28 is connected by a conductor 31 to the conductor 14. The other input terminal of the rectifier 28 is connected by conductor 32 and resistor 33 to the conductor 16.

In operation, the output winding 13 is proportioned so that for a given value of the capacitor 22, the desired regulated voltage will be obtainable with some intermediate value of pile resistance at no load and minimum speed of the alternator. Application of load causes a decrease in the regulated voltage. Inasmuch as the control winding 27 of the regulator 19 senses the output voltage, the decrease in voltage causes a decreased NI in the winding 27 with a corresponding decrease in pull in the armature 24. This permits the spring 26 to compress the pile 18 and thereby decrease the resistance thereof. Decreasing the resistance of the pile 18 causes an increase of current in the capacitor which in turn causes an increase in the leading power factor of the load. An increase in the leading power factor increases the generated voltage which restores the equilibrium of the regulated voltage at its predetermined value. When the load is removed the converse occurs.

When the alternator speed and frequency increases above the minimum speed, the voltage of the machine increases. This results in an increase in NI in the winding 27, hence, increased pull on the armature 24. The pile resistance increases and causes a decrease in current in the capacitor 22. This causes a decrease in the leading power factor which reduces the generated voltage and restores the regulated voltage to its predetermined value. The converse occurs when the speed is decreased.

Figure 2:
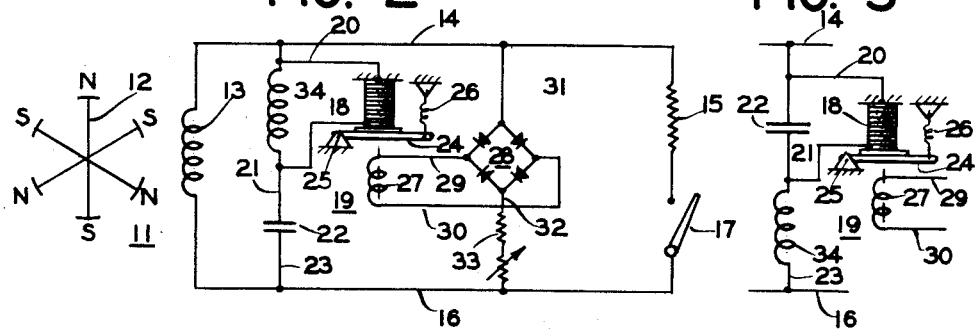
Figure 2 is a schematic diagram illustrating another embodiment of the invention.

Referring now to Figure 2, in which only that portion differing from Figure 1 will be described in detail. An inductance 34 is connected across the carbon pile element 18. By utilizing both inductance and capacitance, the sharp rates of change of current at or near resonance may be utilized to increase the sensitivity of the control.

Figure 3:
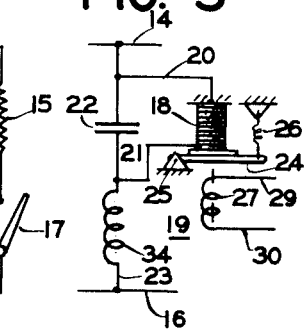
Figure 3 is a modification applicable to Figure 2.

Figure 3 is a modification applicable to Figure 2 in which the capacitor 22 is connected across the pile element 18 and the inductance 34 in series therewith.

Figure 4:
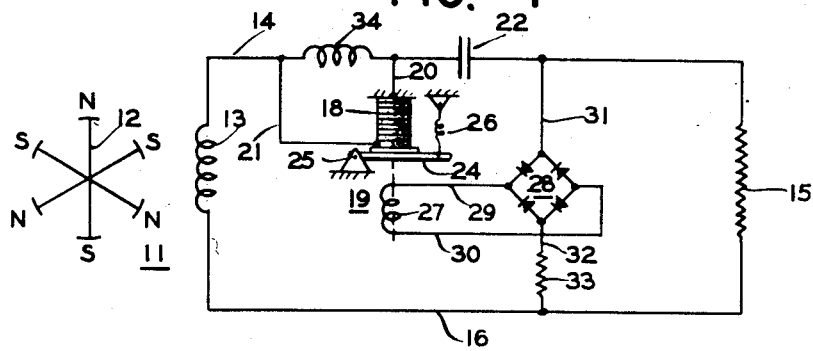
Figure 4 is a schematic diagram illustrating a further embodiment of the invention.

For certain types of loading wherein the load is never reduced to zero, the series connections as illustrated in Figure 4 may be utilized. The inductance 34 and capacitor 22 are connected in series in the output line 14. The carbon pile element 18 is connected by conductors 20 and 21 across the inductance 34.

Figure 5:
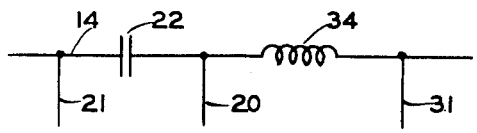
Figure 5 is a modification applicable to Figure 4.

Figure 5 is a modification applicable to Figure 4 in which the carbon pile element 18 is connected across the capacitor 22 instead of the inductance 34 as shown in Figure 4.

It is obvious that the aforenoted means of regulation is a loss method resulting in decreased overall system efficiency. However, it affords a means of regulation in a system where the use of a permanent magnet alternator is dictated by some other requirement, or is presently in existence and voltage regulation requirements take precedence over system efficiency.

Although only three embodiments of the invention have been illustrated and described, various changes in the form and relative arrangement of the parts, which will now appear to those skilled in the art, may be made without departing from the scope of the invention.

What is claimed is:

1. Regulating means for use in a permanent magnet alternator having an output circuit connected thereto, comprising a variable resistance element, a capacitor, circuit means for connecting said resistance element and said capacitor in series across said output circuit, and a control winding responsive to the voltage across said output circuit to vary said resistance element in accordance with changes therein thereby controlling the current in said capacitor to maintain said output voltage substantially constant.

2. Regulating means for use in a permanent magnet alternator having an output circuit connected thereto, comprising a capacitor and an inductance connected in series across said output circuit, a variable resistance element connected in circuit relationship with said capacitor and said inductance to control the current flowing therein, and means responsive to the voltage in said output circuit to vary said resistance element in accordance with a condition of said output voltage.

3. A generator comprising a permanent magnet rotor, a stator winding, an output circuit connected to said stator winding, impedance means connected across said output circuit for varying the power factor of said output circuit in accordance with the current flowing in said impedance means, and means responsive to the voltage in said output circuit to vary the current in said impedance means in accordance with changes in said output voltage.

4. A generator comprising a permanent magnet rotor, a stator winding, an output circuit connected to said stator winding, impedance means connected in circuit relationship with said stator winding to affect the power factor thereof in accordance with the current flowing in said impedance means, and means including a variable resistance element responsive to output voltage to vary the current flowing in said impedance means in accordance with variations in said output voltage.

5. A generator comprising a permanent magnet rotor, a stator winding, an output circuit connected to said stator winding, an output circuit connected to said stator winding, impedance means connected in series in said output circuit for varying the power factor in said stator winding in accordance with the current flowing therein, and means including a carbon pile element responsive to a condition of said output circuit to vary the current flow in said impedance means in accordance with changes in said condition.

References Cited in the file of this patent

UNITED STATES PATENTS

| Number | Name | Date |
|---|---|---|
| 1,763,057 | Krom | June 10, 1930 |
| 2,145,424 | McDowell | Jan. 31, 1939 |
| 2,542,638 | Desch | Feb. 20, 1951 |
| 2,564,320 | Brainard | Aug. 14, 1951 |
| 2,650,341 | Jones | Aug. 25, 1953 |

FOREIGN PATENTS

| Number | Country | Date |
|---|---|---|
| 644,214 | France | June 4, 1928 |